US009886952B2

(12) United States Patent
Choi et al.

(10) Patent No.: US 9,886,952 B2
(45) Date of Patent: Feb. 6, 2018

(54) INTERACTIVE SYSTEM, DISPLAY APPARATUS, AND CONTROLLING METHOD THEREOF

(71) Applicant: SAMSUNG ELECTRONICS CO., LTD., Suwon-si (KR)

(72) Inventors: Chan-hee Choi, Seoul (KR); Kyung-mi Park, Suwon-si (KR); Kwang-il Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 14 days.

(21) Appl. No.: 14/589,313

(22) Filed: Jan. 5, 2015

(65) Prior Publication Data

US 2015/0206530 A1    Jul. 23, 2015

(30) Foreign Application Priority Data

Jan. 22, 2014  (KR) .................. 10-2014-0007910

(51) Int. Cl.
*G10L 15/22* (2006.01)
*G10L 15/32* (2013.01)
(Continued)

(52) U.S. Cl.
CPC ............ *G10L 15/22* (2013.01); *G06F 3/167* (2013.01); *G10L 15/01* (2013.01); *G10L 15/30* (2013.01);
(Continued)

(58) Field of Classification Search
CPC .......... G10L 17/00; G10L 15/26; G10L 15/00
See application file for complete search history.

(56) References Cited

U.S. PATENT DOCUMENTS 6,185,535 B1 * 2/2001 Hedin ................ G10L 15/30
704/270
6,898,567 B2   5/2005 Balasuriya
(Continued)

FOREIGN PATENT DOCUMENTS

WO     01/52239 A1    7/2001
WO   2010/025440 A2   3/2010

OTHER PUBLICATIONS

Lee et al., Golden Mandarin (II), Apr. 27-30, 1993, IEEE, p. II-503-506.*
(Continued)

*Primary Examiner* — David Hudspeth
*Assistant Examiner* — Shreyans Patel
(74) *Attorney, Agent, or Firm* — Sughrue Mion, PLLC

(57) ABSTRACT

An interactive system, a display apparatus, and a controlling method are provided. The display apparatus includes an input which receives an uttered voice of a user; a communicator which transmits a voice signal of the uttered voice to a voice recognition apparatus; a voice recognizer which performs a voice recognition process with the uttered voice; and a controller which determines first or second voice information which has a reliability value greater than or equal to a preset threshold value among a reliability value of the first voice information, and a reliability value of the second voice information to be an execution command of the uttered voice. Therefore, if the display apparatus and an external apparatus simultaneously recognize the uttered voice of the user, the display apparatus selects a voice recognition result proximate to an intent of the user from two voice recognition results.

16 Claims, 9 Drawing Sheets

(51) Int. Cl.
  *G06F 3/16* (2006.01)
  *G10L 15/01* (2013.01)
  *G10L 15/30* (2013.01)

(52) U.S. Cl.
  CPC ........ *G10L 15/32* (2013.01); *G10L 2015/223* (2013.01); *G10L 2015/228* (2013.01)

(56) References Cited

U.S. PATENT DOCUMENTS

| | | | | |
|---|---|---|---|---|
| 7,228,275 | B1* | 6/2007 | Endo | G10L 15/32 704/231 |
| 8,589,156 | B2* | 11/2013 | Burke | G10L 15/30 704/231 |
| 2001/0016813 | A1 | 8/2001 | Brown et al. | |
| 2004/0192384 | A1* | 9/2004 | Anastasakos | G10L 15/30 455/557 |
| 2006/0143010 | A1* | 6/2006 | Han | G10L 15/08 704/254 |
| 2009/0253463 | A1* | 10/2009 | Shin | H04M 1/72583 455/563 |
| 2011/0161077 | A1 | 6/2011 | Bielby | |
| 2012/0209609 | A1 | 8/2012 | Zhao et al. | |
| 2012/0313849 | A1 | 12/2012 | Bak et al. | |
| 2013/0041666 | A1* | 2/2013 | Bak | G10L 15/26 704/246 |
| 2013/0179168 | A1 | 7/2013 | Bae et al. | |

OTHER PUBLICATIONS

Search Report dated Mar. 13, 2015 issued in International Application No. PCT/KR2014/012789 (PCT/ISA/210).
Written Opinion dated Mar. 13, 2015 issued in International Application No. PCT/KR2014/012789 (PCT/ISA/237).
Communication dated Jan. 25, 2017, from the European Patent Office in counterpart European Application No. 14879447.2.
Communication dated Feb. 21, 2017, from the European Patent Office in counterpart European Application No. 14879447.2.

* cited by examiner

INTERACTIVE SYSTEM, DISPLAY APPARATUS, AND CONTROLLING METHOD THEREOF

CROSS-REFERENCE TO RELATED APPLICATION(S)

This application claims priority under 35 U.S.C. §119 from Korean Patent Application No. 10-2014-0007910, filed on Jan. 22, 2014, in the Korean Intellectual Property Office, the disclosure of which is incorporated herein by reference in its entirety.

BACKGROUND

1. Field

Methods and apparatuses consistent with the exemplary embodiments relate to providing an interactive system, a display apparatus, and a controlling method thereof, and more particularly, to providing an interactive system for providing response information corresponding to an uttered voice of a user, a display apparatus, and a controlling method.

2. Description of the Related Art

If an uttered voice of a user is input to a display apparatus, the display apparatus directly performs a voice recognition process with respect to the uttered voice of the user, or the display apparatus and an external apparatus simultaneously perform a voice recognition process with respect to the uttered voice of the user according to a recognition condition in an interactive system. If the display apparatus and the external apparatus simultaneously perform the voice recognition process, the display apparatus compares the reliability of the voice recognition performed by the display apparatus with the reliability of the voice recognition performed through the external apparatus, selects a highly reliable voice recognition result on the basis of the comparison, and performs an operation based on the selected voice recognition result.

However, according to this existing reliability comparing method, the display apparatus and the external apparatus have different candidate groups of execution commands corresponding to the uttered voice. Therefore, reliability of a voice recognition result of the same uttered voice acquired by the display apparatus may be different from reliability of a voice recognition result of the same uttered voice acquired by the external apparatus.

For example, the display apparatus may have a candidate group of 100 execution commands corresponding to the uttered voice, and the external apparatus may have a candidate group of 10000 execution commands corresponding to the uttered voice. In this case, although there is a high possibility that the external apparatus will have a similar execution command to a voice recognition result recognized from the uttered voice of the user compared to the display apparatus, the external apparatus may calculate a lower reliability value than the display apparatus.

Also, the display apparatus may recognize texts other than the texts related to the 100 execution commands among texts included in the voice recognition result recognized from the uttered voice of the user, as noise to calculate a higher reliability value than that of the voice recognition result acquired by the external apparatus.

Although these problems exist, an existing display apparatus simply selects a highly reliable voice recognition result as an execution command of an uttered voice of user. As a result, a voice recognition result different from the uttered voice of the user is selected.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a method for selecting a voice recognition result which is proximate to an intent of a user from among at least two voice recognition results when a display apparatus and an external apparatus simultaneously recognize an uttered voice of a user.

The exemplary embodiments provide a method for performing an operation appropriate for an uttered voice of a user or providing response information appropriate for the uttered voice of the user.

According to an aspect of the exemplary embodiments, there is provided a display apparatus comprising: an input configured to receive an uttered voice of a user; a communicator configured to transmit a voice signal of the uttered voice to a voice recognition apparatus; a voice recognizer configured to perform a voice recognition process with respect to the uttered voice; and a controller configured to determine a first voice information or a second voice information which has a reliability value greater than or equal to a preset threshold value among a reliability value of the first voice information recognized by the voice recognizer and a reliability value of the second voice information recognized by the voice recognition apparatus, as an execution command of the uttered voice.

The first voice information and the second voice information is text information into which the voice signal of the uttered voice is converted. When the reliability values of the first voice information and the second voice information are greater than or equal to the preset threshold value, the controller compares lengths of character strings of the text information of the first voice information and the text information of the second voice information to determine one of the first voice information or the second voice information which has a longer character string to be an execution command.

The controller is configured to calculate a similarity value of pronunciation strings from the text information of the first voice information and the text information of the second voice information based on a predefined similarity algorithm when the lengths of the character strings are the same, determine the first voice information as an execution command when the calculated similarity value is greater than or equal to a preset threshold value, and determine the second voice information as an execution command when the calculated similarity value is lower than the threshold value.

When the execution command of the uttered voice is determined, the controller is configured to determine a domain based on one of the first voice information and the second voice information determined as the execution command, and determine the one of the first voice information and the second voice information determined as the execution command as a final execution command according to a condition that the determined domain and a domain of a current operation mode of the display apparatus correspond to each other.

When the reliability values of the first voice information and the second voice information are lower than the threshold value, the controller is configured to determine domains of the first voice information and the second voice information, apply a weight to the reliability value of one of the first voice information and the second voice information which has a domain corresponding to the domain of the current operation mode of the display apparatus, and determine the one of the first voice information and the second voice information to which the weight is applied as an execution command according to a condition that the reliability value of the one of the first voice information and the second voice information to which the weight is applied is greater than or equal to the threshold value.

The display apparatus may further include a storage configured to store control commands corresponding to a plurality of pieces of voice information; and a display configured to display a voice recognition result of response information received from an interactive server.

When the first voice information is recognized by the voice recognizer and being determined as the execution command, the controller is configured to perform a control operation according to a control command corresponding to the first voice information among the control commands stored in the storage and, when the second voice information is received from the voice recognition apparatus and being determined as the execution command, transmit the second voice information to the interactive server through the communicator, and receive response information related to the second voice information from the interactive server.

According to another aspect of the exemplary embodiments, there is provided a method of controlling a display apparatus. The method comprising receiving an uttered voice of a user; performing a voice recognition process with respect to the uttered voice to calculate a reliability value of first voice information; transmitting a voice signal of the uttered voice to a voice recognition apparatus; when a voice recognition result of the uttered voice is received from the voice recognition apparatus, comparing the reliability value of the first voice information and a reliability value of second voice information included in the voice recognition result with a preset threshold value; and when the reliability value of the first voice information or the second voice information is greater than or equal to the threshold value, determine the first voice information or the second voice information which has the reliability value greater than or equal to the threshold value as an execution command of the uttered voice.

The first voice information and the second voice information is text information into which a voice signal of the uttered voice is converted. When the reliability value of the first voice information and the reliability value of the second voice information is greater than or equal to the threshold value, lengths of character strings of the text information of the first voice information and the text information of the second voice information are compared to determine the first or second voice information which has a longer character string to be an execution command.

When the lengths of the character strings are the same, a similarity value of pronunciation strings of the text information of the first voice information and the text information of the second voice information are calculated based on a pre-stored similarity algorithm, when the calculated reliability value is greater than or equal to a preset threshold value, the first voice information is determined as an execution command, and when the calculated similarity value is lower than the threshold value, the second voice information is determined as the execution command.

The method may further comprise, when the execution command of the uttered voice is determined, determining a domain based on the one of the first voice and the second voice information determined as the execution command; and determining the one of the first voice information and the second voice information determined as the execution command as a final execution command according to a condition that the determined domain corresponds to a domain of a current operation mode of the display apparatus.

The method may further comprise when the reliability value of the first voice information and the reliability value of the second voice information is lower than the threshold value, determining domains of the first voice information and domains of the second voice information; and applying a weight to one of the reliability value of the first voice information and the reliability value of the second voice information which has a domain corresponding to the domain of the current operation mode of the display apparatus. The first voice information or the second voice information to which the weight is applied may be determined as an execution command according to whether the reliability value of the first voice information or the reliability value of the second voice information to which the weight is applied is greater than or equal to the threshold value.

The method may further comprise, when the first voice information is determined to be the execution command, performing a control operation according to a control command corresponding to the first voice information among a plurality of pre-stored control commands, and when the second voice information is determined to be the execution command, receiving response information corresponding to the second voice information from an interactive server and displaying a voice recognition result related to the received response information.

According to another aspect of the exemplary embodiments, there is provided an interactive system including a display apparatus configured to, when an uttered voice of a user is input, perform a voice recognition process based on a voice signal of the uttered voice, and transmit the voice signal to a voice recognition apparatus; and the voice recognition apparatus is configured to perform a voice recognition process based on the voice signal received from the display apparatus, and transmit a voice recognition result of the voice recognition process to the display apparatus. When the voice recognition result is received from the voice recognition apparatus, the display apparatus determines one of first voice information and second voice information which has a reliability value greater than or equal to a preset threshold value among a reliability value of the first voice information recognized in the display apparatus and a reliability value of the second voice information included in the voice recognition result, as an execution command of the uttered voice.

The first voice information and the second voice information may be text information into which a voice signal of the uttered voice is converted. When the reliability values of the first voice information and the reliability values of the second voice information are greater than or equal to the threshold value, the display apparatus may compare lengths of character strings of the text information of the first voice information and the text information of the second voice information to determine the first voice command or the second voice information which has a longer character string as an execution command.

The display apparatus may calculate a similarity value of pronunciation strings of the text information of the first voice information and the text information of the second voice information based on a predefined similarity algorithm when the lengths of the character strings are the same, determine the first voice information as an execution command when the calculated similarity value is greater than or equal to a preset threshold value, and determine the second voice information as an execution command when the calculated similarity value is lower than the threshold value.

The display apparatus may determine a domain based on one of the first voice information and the second voice information determined as the execution command when the execution command of the uttered voice is determined and determine the first voice information or the second voice information determined as the execution command as a final execution command according to whether the determined domain corresponds to a domain of a current operation mode of the display apparatus.

When the reliability values of the first voice information and the reliability values of the second voice information are lower than the threshold value, the display apparatus determines domains of the first voice information and the second voice information, applies a weight to the reliability value of one of the first voice information and the second voice information which has a domain corresponding to the domain of the current operation mode of the display apparatus, and determines the first voice information and the second voice information to which the weight is applied as an execution command according to a condition that the reliability value of the first voice information and the second voice information to which the weight is applied is greater than or equal to the threshold value.

The display apparatus performs a control operation according to a control command corresponding to the first voice information when the first voice information is determined to be an execution command, and transmits the second voice information to an interactive server to receive response information corresponding to the second voice information and displays a voice recognition result corresponding to the received response information when the second voice information is determined to be the execution command.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
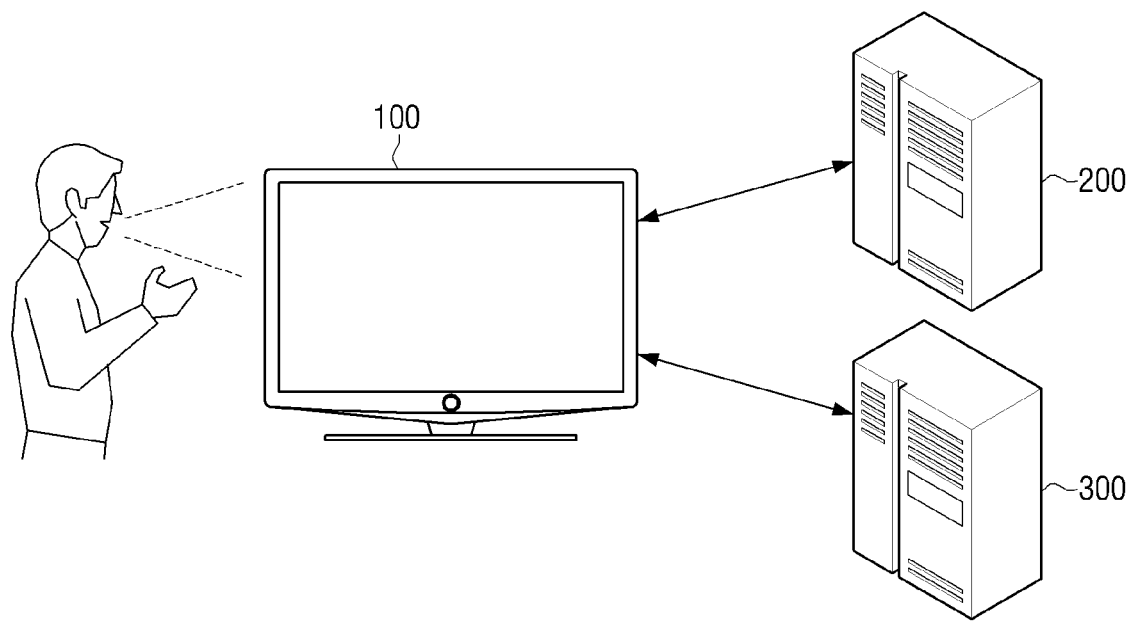
FIG. 1 is a view illustrating an interactive system for providing response information appropriate for an uttered voice of a user, according to an exemplary embodiment.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 2:
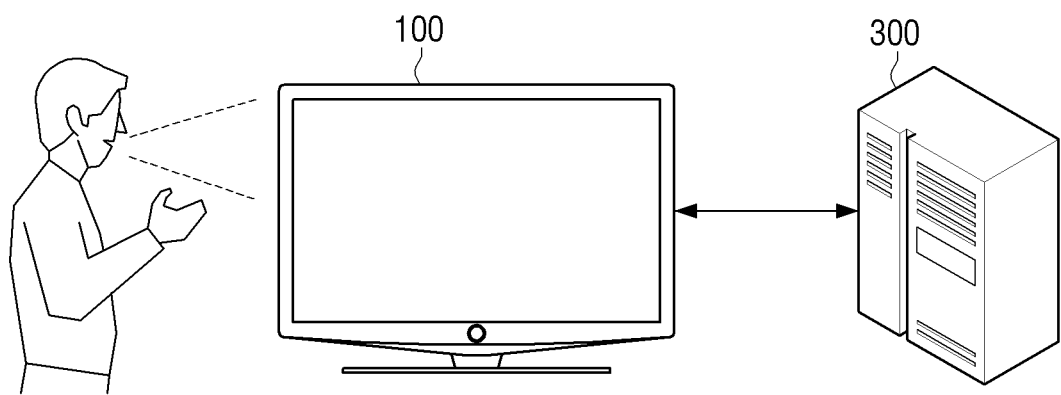
FIG. 2 is a view illustrating an interactive system for providing response information appropriate for an uttered voice of a user, according to another exemplary embodiment.

FIG. 1 is a view illustrating an interactive system for providing response information appropriate for an uttered voice of a user, according to an exemplary embodiment. FIG. 2 is a view illustrating an interactive system for providing response information appropriate for an uttered voice of a user, according to another exemplary embodiment.

Referring to FIG. 1, the interactive system includes a display apparatus 100, a voice recognition apparatus 200, and an interactive server 300.

The display apparatus 100 may be an apparatus that may access the Internet and may be realized as various types of electronic devices such as a smart television (TV), a portable phone such as a smartphone, a desktop personal computer (PC), a notebook PC, a navigation system, etc. If an uttered voice of a user is input, the display apparatus 100 performs an operation corresponding to the input uttered voice of the user. In detail, the display apparatus 100 may perform a function or output a voice recognition result related to the uttered voice of the user according to a control command corresponding to the uttered voice of the user.

The voice recognition apparatus 200 generates text type voice information based on a voice signal of the uttered voice of the user and calculates a reliability value of the text type voice information based on the text type voice information and pattern information of each of a plurality of pre-stored uttered voices. The voice recognition apparatus 200 transmits a voice recognition result, including the text type voice information generated from the voice signal of the uttered voice of the user and the reliability value of the text type voice information, to the display apparatus 100.

The interactive server 300 parses the text type voice information received from the display apparatus 100 to extract utterance factors, generates response information for performing the operation corresponding to the uttered voice of the user based on the extracted utterance factors, and transmits the response information to the display apparatus 100. Therefore, the display apparatus 100 may display the voice recognition result related to the uttered voice of the user on a screen based on the response information received from the interactive server 300.

In detail, if the uttered voice of the user is input, the display apparatus 100 converts the input uttered voice into a voice signal, that is, a digital signal, and performs a voice recognition based on the voice signal to generate voice information (hereinafter referred to as first voice information) of the uttered voice of the user. If the first voice information is generated, the display apparatus 100 may calculate a reliability value of the first voice information based on the pattern information of each of the pre-stored plurality of uttered voices.

If the uttered voice of the user is input, the display apparatus 100 transmits the voice signal of the input uttered voice to the voice recognition apparatus 200. If the voice signal is received, the voice recognition apparatus 200 performs a voice recognition with respect to the received voice signal to generate voice information (hereinafter referred to as second voice information) of the uttered voice of the user. If the second voice information is generated, the voice recognition apparatus 200 may calculate a reliability value of the second voice information based on the pattern information of each of the plurality of pre-stored uttered voices. If the reliability value of the second voice information is calculated, the voice recognition apparatus 200 transmits a voice recognition result, including the second voice information and the reliability value of the second voice information, to the display apparatus 100.

The first voice information and the second voice information may be text type information into which the voice signal of the uttered voice of the user is converted. According to exemplary embodiments, the display apparatus 100 and the voice recognition apparatus 200 may generate the uttered voice of the user as text type voice information by using a speech-to-text (STT) algorithm.

If the voice recognition result of the uttered voice of the user is received from the voice recognition apparatus 200, the display apparatus 100 compares the reliability value of the first voice information and the reliability value of the second voice information included in the received voice recognition result with a preset threshold value (hereinafter referred to as a first threshold value). In other words, the display apparatus 100 compares the reliability value of the first voice information with the preset first threshold value, and compares the reliability value of the second voice information with the first threshold value. If the reliability value of one of the first voice information and the second voice information is greater than or equal to the first threshold value according to the comparison result, the display apparatus 100 determines the one of the first voice information and the second voice information which has the reliability value which is greater than or equal to the first threshold value as the voice information which is an execution command.

According to the exemplary embodiments, if the reliability value of the first voice information is greater than or equal to the first threshold value, the display apparatus 100 determines the first voice information as an execution command. The display apparatus 100 may perform a control operation according to a control command corresponding to the first voice information among control commands corresponding to a plurality of pieces of pre-stored voice information.

If the reliability value of the second voice information is greater than or equal to the first threshold value, the display apparatus 100 determines the second voice information as an execution command and transmits the second voice information determined as the execution command to the interactive server 300. The interactive server 300 generates response information related to the uttered voice of the user based on the second voice information received from the display apparatus 100 and transmits the response information to the display apparatus 100. Therefore, the display apparatus 100 may display the voice recognition result related to the uttered voice of the user on the screen based on the response information received from the interactive server 300.

If the first voice information and the second voice information respectively have the reliability values greater than or equal to the first threshold value, the display apparatus 100 may compare lengths of character strings of text information of the first voice information and the second voice information and determine the first voice information or the second voice information which has a longer character string as an execution command.

According to the exemplary embodiments, the text information of the second voice information may have a longer character string than the text information of the first voice information. In this case, the display apparatus 100 determines the second voice information as an execution command and transmits the second voice information determined as the execution command to the interactive server 300. The interactive server 300 generates response information related to the uttered voice of the user based on the second voice information received from the display apparatus 100 and transmits the response information to the display apparatus 100. Therefore, the display apparatus 100 may display a voice recognition result related to the uttered voice of the user on the screen based on the response information received from the interactive server 300.

If the character strings of the text information of the first voice information and the second voice information are the same, the display apparatus 100 extracts pronunciation strings from the text information of the first voice information and the text information of the second voice information. The display apparatus 100 calculates a similarity value from the extracted pronunciation strings of the first voice information and the second voice information and compares the calculated similarity value with a preset threshold value (referred to as a second threshold value). If the calculated similarity value is greater than or equal to the second threshold value according to the comparison result, the display apparatus 100 may determine the first voice information as an execution command and perform a control operation according to a control command corresponding to the first voice information determined as the execution command among pre-stored control commands.

The present exemplary embodiment is not limited thereto, and if the first or second voice information that will be determined as an execution command is not determined based on the similarity values of the first voice information and the second voice information, the display apparatus 100 may compare the lengths of the character strings of the text information of the first voice information and the second voice information to determine the first voice information or the second voice information which has a longer character string to be an execution command.

According to another exemplary embodiment, the display apparatus 100 may determine the first voice information or the second voice information determined as the execution command, as a final execution command according to whether a domain of the first or second voice information determined as the execution command corresponds to a domain of a current operation mode of the display apparatus 100.

According to the exemplary embodiments, if the current operation mode of the display apparatus 100 is a broadcast program execution mode, the display apparatus 100 may set the domain of the current operation mode to a control-related domain. If the current operation mode of the display apparatus 100 is an application execution mode, the display apparatus 100 may set the domain of the current operation mode to a content recommendation-related domain. For example, if the current operation mode of the display apparatus 100 is the application execution mode, and the first voice information or the second voice information determined as the execution command corresponds to the control-related domain, the display apparatus 100 may determine that the control-related domain and the content recommendation-related domain do not correspond to each other and determine the first voice information or the second voice information, which is not determined as an execution command, as a final execution command.

If the current operation mode of the display apparatus 100 is the application execution mode, and the first voice information or the second voice information determined as the execution command corresponds to the content recommendation-related domain, the display apparatus 100 may determine that the control-related domain and the content recommendation-related domain correspond to each other and determine the first or second voice information determined as the execution command as a final execution command.

Therefore, as described above, the display apparatus 100 may perform a control operation related to the uttered voice of the user based on the first or second voice information determined as the final execution command or may display a voice recognition result related to the uttered voice of the user based on the response information received from the interactive server 300.

If the reliability values of the first voice information and the second voice information are lower than the first threshold value, the display apparatus 100 may determine domains of the first voice information and the second voice information and apply a weight to a reliability value of the first or second voice information having the determined domain corresponding to the domain of the current operation mode of the display apparatus 100.

If the reliability value of the first or second voice information to which the weight is applied is greater than or equal to the first threshold value, the display apparatus 100 may determine the first or second voice information, to which the weight is applied, as an execution command and perform a control operation related to the uttered voice of the user based on the first or second voice information corresponding to the determined execution command or display a voice recognition result related to the uttered voice of the user based on the response information received from the interactive server 300 as described above.

In the present exemplary embodiment, the voice recognition apparatus 200 and the interactive server 300 have been separately described in the interactive system. However, the exemplary embodiment is not limited thereto, and the interactive system may include the display apparatus 100 and the interactive server 300 as shown in FIG. 2. In this case, like the voice recognition apparatus 200 described above, the interactive server 300 may perform a voice recognition process with respect to a voice signal of an uttered voice of a user to generate voice information and transmit a voice recognition result, including the generated voice information and a reliability value of the voice information, to the display apparatus 100.

A control operation related to an uttered voice of a user or an operation of providing a voice recognition result in the interactive system including the display apparatus 100, the voice recognition apparatus 200, and the interactive server 200 has been described in brief.

Elements of the display apparatus 100 will now be described in detail.

Figure 3:
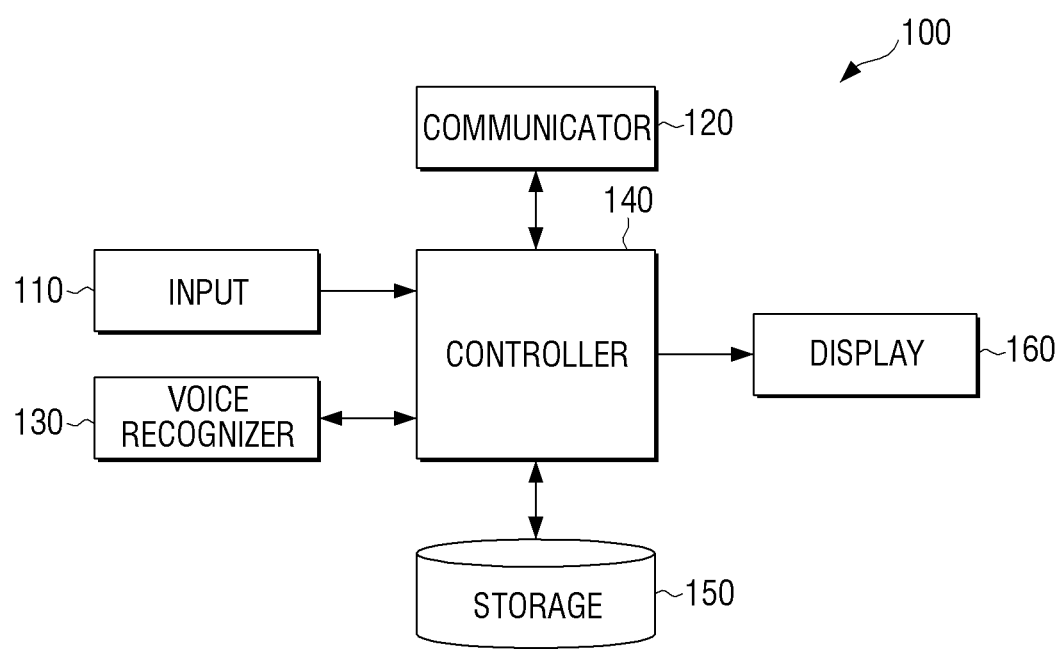
FIG. 3 is a block diagram of a display apparatus according to an exemplary embodiment.

FIG. 3 is a block diagram of the display apparatus 100, according to an exemplary embodiment.

Referring to FIG. 3, the display apparatus 100 includes an input 110, a communicator 120, a voice recognizer 130, a controller 140, a storage 150, and a display 160.

The input 110 receives an uttered voice of a user. In detail, if an analog uttered voice of the user is input, the input 110 samples the inputted analog uttered voice of the user to convert the inputted analog uttered voice of the user into a digital signal. If the inputted uttered voice of the user includes noise (for example, an air conditioner sound, a vacuum clear sound, etc.), the input 110 may remove the noise from the uttered voice of the user and convert the uttered voice of the user, from which the noise is removed, into a digital signal. The input 110 may also receive various types of user controls and transmit the various types of user controls to the controller 140. In this case, the input 110 may receive a user control command through a touch pad, a key pad including various types of function keys, numerical keys, special keys, character keys, etc. or a touch screen.

The communicator 120 transmits a voice signal of the uttered voice of the user input through the input 110 to the voice recognition apparatus 200 and receives a voice recognition result of the voice signal from the voice recognition apparatus 200. The communicator 120 may also transmit voice information determined as an execution command to the interactive server 300 according to a control command of the controller 140 and receive response information generated in relation to the voice information from the interactive server 300.

The communicator 120 may include various types of communication modules such as a short-range communication module (not shown), a wireless communication module (not shown), etc. The short-range wireless communication module is a communication module that performs a wireless communication with the interactive server 300 that is positioned in a short range, and an external server (not shown) that provides a content, may be, for example, Bluetooth, Zigbee, or the like. The wireless communication module is a module that is connected to an external network to perform a communication according to a wireless communication protocol such as WiFi, IEEE, or the like. The wireless communication module may further include a mobile communication module that accesses a mobile communication network to perform a communication according to various mobile communication standards such as $3^{rd}$ Generation (3G), $3^{rd}$ Generation Partnership Project (3GPP), Long Term Evolution (LTE), etc.

The voice recognizer 130 performs a voice recognition process with respect to the uttered voice of the user input through the input 110 to generate first voice information. Here, the first voice information may be text information into which the voice signal of the uttered voice of the user is converted. According to exemplary embodiments, the voice recognizer 130 may convert the uttered voice of the user into a text by using an STT algorithm.

For example, if an uttered voice "Turn up the volume!" is inputted, the input 110 converts the uttered voice "Turn up the volume!" into a digital voice signal. In this case, the voice recognizer 130 may generate text type of first voice information from the voice signal of the uttered voice "Turn up the volume!" Here, the voice recognizer 130 may generate first voice information related to the uttered voice of the user based on a candidate group of a plurality of pieces of voice information that are stored in the storage 150 and calculate a reliability value of the generated first voice information.

The controller 140 controls overall operations of the elements of the display apparatus 100. In particular, if the uttered voice of the user is converted into the digital voice signal through the input 110, the controller 140 controls the voice recognizer 130 to perform a voice recognition process based on the voice signal. Also, if the uttered voice of the user is converted into the digital voice signal through the input 110, the controller 140 controls the communicator 120 to transmit the voice signal to the voice recognition apparatus 200. Therefore, the voice recognizer 130 may perform the voice recognition with respect to the uttered voice of the user through an operation as described above, and the communicator 120 may transmit the voice signal of the uttered voice of the user to the voice recognition apparatus 200.

The controller 140 determines the first or second voice information which has a reliability value equal to a preset threshold value (hereinafter referred to as a first threshold value) among the reliability value of the first voice information recognized by the voice recognizer 130 and a reliability value of second voice information included in the voice recognition result received from the voice recognition apparatus 200, as an execution command of the uttered voice of the user.

For example, the user may utter a voice "Show me MBC!". If this uttered voice is input, the input 110 may convert the inputted uttered voice into a digital voice signal, and the voice recognizer 130 may generate first voice information related to the uttered voice of the user based on a candidate group of a plurality of pieces of voice information stored in the storage 150 and calculate a reliability value of the generated first voice information as described above.

For example, the storage 150 may store voice information corresponding to 100 candidate groups of uttered voices such as MBC, KBS, SBS, EBS, turn up the channel, turn down the channel, turn up the volume, turn down the volume, etc. In this case, if text type of voice information "Show me MBC!" is generated from the voice signal of the uttered voice of the user, the voice recognizer 130 may recognize voice information "MBC" of voice information "Show me MBC!" as first voice information of the uttered voice of the user based on the voice information corresponding to 100 candidate groups stored in the storage 150 and recognize the other voice information, i.e., "Show me", as noise. The voice recognizer 130 may calculate a reliability value of the first voice information based on voice information corresponding to candidate groups stored in the storage 150. As in the above-described example, the storage 150 may store voice information "MBC" among voice information corresponding to 100 candidates, and the first voice information recognized from the uttered voice of the user may be "MBC." In this case, since voice information matching the first voice information is stored in the storage 150, the voice recognizer 130 may calculate a reliability value as 100.

Similarly to this, if the voice signal of the uttered voice of the user is received from the display apparatus 100, the voice recognition apparatus 200 may recognize the uttered voice of the user from the received voice signal to calculate second voice information and a reliability value of the second voice information.

According to the exemplary embodiments, the voice recognition apparatus 200 may convert the uttered voice of the user into a text by using an STT algorithm. As in the above-described example, if the voice signal of the uttered voice "Show me MBC!" is received, the voice recognition apparatus 200 may generate text type of second voice information "Show me MBC!" by using an STT algorithm. The voice recognition apparatus 200 may calculate a reliability value of the text type of second voice information "Show me MBC!" based on the candidate group of the plurality of pieces of voice information that are stored in the voice recognition apparatus. The reliability value of the second voice information may be lower than or equal to the reliability value of the first voice information calculated through the voice recognizer 130 of the display apparatus 100. The calculation of the reliability value based on the first or second voice information recognized from the voice signal is a well-known technology, and thus a detailed description thereof is omitted herein.

The voice recognition apparatus 200 is an apparatus that performs the voice recognition with respect to the uttered voice of the user and may store many more pieces of voice information of the uttered voice than the display apparatus 100. In other words, the number of objects of a candidate group corresponding to voice information related to an uttered voice stored in the voice recognition apparatus 200 may be larger than the number of objects of a candidate group corresponding to voice information related to an uttered voice stored in the display apparatus 100. Since a larger number of objects of the candidate group corresponding to the voice information exist than in the display apparatus 100 as described above, there is a high possibility that voice information similar to the second voice information recognized by the voice recognition apparatus 200 will exist. Therefore, although there is a high possibility that the second voice information recognized by the voice recognition apparatus 200 will be more similar to the uttered voice of the user than the first voice information recognized by the voice recognizer 130 of the display apparatus 100, there is a high possibility that the reliability value of the second voice information calculated through the voice recognition apparatus 200 will be lower than or equal to the reliability value of the first voice information calculated through the voice recognizer 130.

If the reliability value of the second voice information is calculated, the voice recognition apparatus 200 transmits a voice recognition result, including the second voice information and the reliability value of the second voice information, to the display apparatus 100.

If the voice recognition result is received, the controller 140 may determine the first or second voice information which has a reliability value greater than or equal to a preset first threshold value among the reliability value of the second voice information included in the received recognition result and the reliability value of the first voice information calculated through the voice recognizer 130, as an execution command. For example, the reliability value of the second voice information may be 85, and the reliability value of the first voice information may be 100 as in the above-described example. Also, if the preset first threshold value is set to 90, the controller 140 may determine the first voice information among the first voice information and the second voice information which has a reliability value greater than the first threshold value to be an execution command.

Therefore, the controller 140 acquires a control command related to the first voice information among control commands corresponding to the plurality of pieces of voice information stored in the storage 150, and performs a control operation based on the acquired control command. In other words, the controller 140 may change a currently selected channel into channel MBC according to a control command related to the first voice information generated in relation to the uttered voice "Show me MBC!".

If the reliability values of the first voice information and the second voice information are greater than or equal to the preset first threshold value, the controller 140 may determine the first or second voice information as an execution command according to similarity between the text information of the first voice information and the second voice information. For this, the controller 140 may have a structure as shown in FIG. 4.

Figure 4:
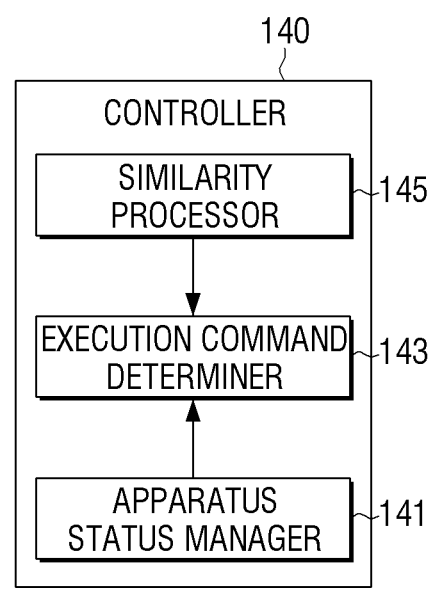
FIG. 4 is a block diagram illustrating a detailed structure of a controller, according to an exemplary embodiment.

FIG. 4 is a block diagram illustrating a detailed structure of the controller 140, according to an exemplary embodiment.

Referring to FIG. 4, the controller 140 includes a similarity processor 145 and an execution command determiner 143.

In detail, if reliability values of first voice information and second voice information are greater than or equal to a first threshold, the similarity processor 145 compares lengths of character strings generated from text information of the first voice information and the second voice information to determine whether there is voice information which has a longer character string among the first voice information and the second voice information. If it is determined that one of the first voice information and the second voice information has a longer character string than the other, the execution command determiner 143 determines the first or second voice information which has the longer character string to be an execution command.

An operation of comparing lengths of character strings of text information of first voice information and second voice information to determine an execution command of an uttered voice of a user if reliability values of the first voice information and the second voice information are greater than or equal to a first threshold value, will now be described in detail.

Figure 5:
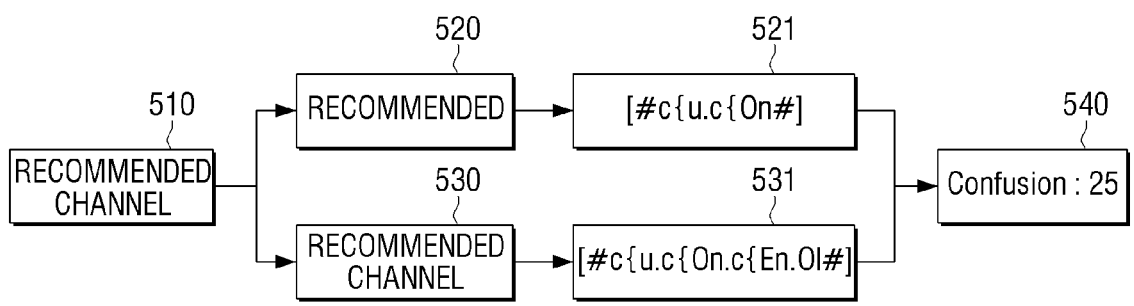
FIG. 5 is a view illustrating a comparison between lengths of character string of text information of first voice information and text information of second voice information, according to an exemplary embodiment.

FIG. 5 is a view illustrating a comparison between lengths of character strings of text information of first voice information and second voice information, according to an exemplary embodiment.

As shown in FIG. 5, the voice recognizer 130 of the display apparatus 100 may generate first voice information 520 "recommended" in relation to an uttered voice 510 "recommended channel", and the voice recognition apparatus 200 may generate second voice information 530 "recommended channel" in relation to the uttered voice 510 "recommended channel". If reliability values of the first voice information 520 and the second voice information 530 are greater than or equal to a preset first threshold value, the similarity processor 145 generates character strings from text information of the first voice information 520 and the second voice information 530. As shown in FIG. 5, a character string 521 "[#c{u.c{On#]" may be generated from the text information of the first voice information 520, and a character string 531 "[#c{u.c{On.c{En.O1#]" may be generated from the text information of the second voice information 530.

If the character strings 521 and 531 of the respective first voice information 520 and the second voice information 530 are generated, the similarity processor 145 calculates a similarity value 540 based on the character strings 521 and 531 of the respective first voice information 520 and the second voice information 530. As shown in FIG. 5, since a length of the character string 531 of the second voice information 530 is longer than a length of the character string 521 of the first voice information 520, the similarity value 540 which is lower than a preset threshold value may be calculated.

If the similarity value 540 which is lower than the preset threshold value is calculated, the execution command determiner 143 may determine the second voice information 530 among the first voice information 520 and the second voice information 530 as a voice recognition result similar to an uttered voice of a user and determine the second voice information 530 as an execution command of the uttered voice of the user.

If lengths of character strings of the text information of the first voice information and the second voice information are the same, the similarity processor 145 calculates a similarity value of pronunciation strings generated from the text information of the first voice information and the second voice information by using a predefined similarity algorithm. Here, the predefined similarity algorithm may be confusion matrix. However, the present exemplary embodiment is not limited thereto, and the similarity processor 145 may compare the pronunciation strings generated from the text information of the first voice information and the second voice information to calculate the similarity value based on how many of the same pronunciation characters the pronunciation strings include.

If the similarity value of the pronunciation strings generated from the text information of the first voice information and the second voice information is calculated as described above, the execution command determiner 143 may compare the calculated similarity value with a preset threshold value (hereinafter referred to as a second threshold value). If the calculated similarity value is greater than or equal to the second threshold value, the execution command determiner 143 may determine the first voice information as an execution command of the uttered voice of the user. If the calculated similarity value is lower than the second threshold value, the execution command determiner 143 may determine the second voice information as an execution command of the uttered voice of the user.

An operation of determining an execution command of an uttered voice of a user according to similarity between pronunciation strings generated from text information of first voice information and second voice information if lengths of character strings generated from the text information of the first voice information and the second voice information are the same, or a similarity value of the lengths of the character strings is greater than or equal to a preset threshold value, will now be described in detail.

Figure 6:
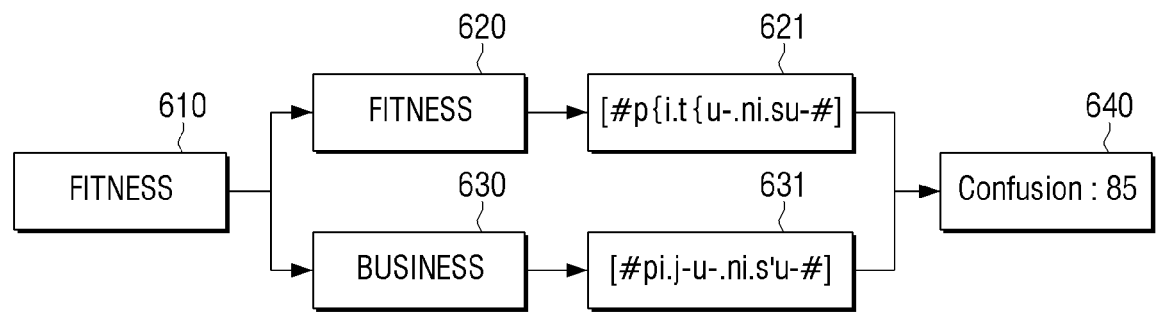
FIG. 6 is a view illustrating a comparison between similarity information of a pronunciation string of text information of first voice information and similarity information of a pronunciation string of text information of second voice information, according to an exemplary embodiment.

FIG. 6 is a view illustrating similarity information of pronunciation strings of text information of first voice information and second voice information, according to an exemplary embodiment exemplary embodiment.

As shown in FIG. 6, the voice recognizer 130 of the display apparatus 100 may generate first voice information 620 "fitness" in relation to an uttered voice 610 "fitness", and the voice recognition apparatus 200 may generate second voice information 630 "business" in relation to the uttered voice 610 "fitness". Reliability values of the first voice information 620 and the second voice information 630 may be greater than or equal to a preset first threshold value, and lengths of character strings generated from text information of the first voice information 620 and the second voice information 630 may be the same. In this case, the similarity processor 145 generates pronunciation strings from the text information of the first voice information 620 and the second voice information 630. As shown in FIG. 6, a pronunciation string 621 "[#p{i.t{u-.ni.su#]" may be generated from the text information of the first voice information 620, and a pronunciation string 631 "[#pi.j-u-.ni.s'u-#]" may be generated from the text information of the second voice information 630.

If the pronunciation strings 621 and 631 of the first voice information 620 and the second voice information 630 are generated, the similarity processor 145 calculates a similarity value 640 according to a similarity between the pronunciation strings 621 and 631 of the respective first voice information 620 and the second voice information 630. In detail, the similarity processor 145 may compare pronunciation characters belonging to the pronunciation strings 621 and 631 of the respective first voice information 620 and the second voice information 630 to calculate the similarity value 640 based on how many of the same pronunciation characters the pronunciation strings 621 and 631 include.

If the similarity value 640 is calculated, the execution command determiner 143 compares the similarity value 640 with a preset second threshold value. If the similarity value 640 is greater than or equal to the second threshold value according to the comparison result, the execution command determiner 143 may determine the first voice information 620, among the first voice information 620 and the second voice information 630, to be a voice recognition result which is similar to an uttered voice of a user, and determine the first voice information 620 to be an execution command of the uttered voice of the user.

If the similarity value 640 is lower than the preset second threshold value, the execution command determiner 143 may determine the second voice information 630, among the first voice information 620 and the second voice information 630, to be a voice recognition result similar to the uttered voice of the user, and determine the second voice information 630 to be an execution command of the uttered voice of the user.

As shown in FIG. 4, the controller 140 may further include an apparatus status manager 141. The execution command determiner 143 may determine whether preset voice information determined as an execution command will be determined as a final execution command based on an execution result of the apparatus status manager 141.

In detail, the apparatus status manager 141 periodically monitors a current operation mode of the display apparatus 100 and transmits the monitoring result to the execution command determiner 143. Therefore, if first or second voice information is determined as an execution command of the uttered voice of the user, the execution command determiner 143 may determine the first or second voice information determined as the execution command as a final execution command according to whether a domain of the current operation mode of the display apparatus 100 corresponds to a domain of the first or second voice information determined as the execution domain. In other words, if the domain of the current operation mode of the display apparatus 100 corresponds to the domain of the first or second voice information determined as the execution command, the execution command determiner 143 determines the first or second voice information determined as the execution command as a final execution command. If the domain of the current operation mode of the display apparatus 100 does not correspond to the domain of the first or second voice information determined as the execution command, the execution command determiner 143 may determine the first or second voice information, which is not determined as an execution command, as a final execution command.

According to the exemplary embodiments, if first voice information among the first voice information and the second voice information is determined as an execution command, the execution command determiner 143 may determine a domain based on the first voice information. For example, first voice information that is determined as an execution command in relation to an uttered voice "Search for action movie!" may include text information "action". In this case, the execution command determiner 143 may determine a domain of the first voice information as an apparatus control-related domain for changing a channel based on a control command related to the first voice information "action".

If the display apparatus 100 operates in an application execution mode based on status information about the current operation mode of the display apparatus 100 monitored through the apparatus status manager 141, the execution command determiner 143 may determine a domain of the current operation mode of the display apparatus 100 as a content recommendation-related domain.

If the domain of the first voice information determined as the execution command and the domain of the current operation mode of the display apparatus 100 are determined as described above, the execution command determiner 143 determines whether the two domains correspond to each other. If it is determined that the two domains do not correspond to each other, the execution command determiner 143 may determine second voice information, which is not determined as an execution command, as a final execution command.

If the first voice information determined as the execution command is a control-related execution command for controlling an operation of an apparatus, and the display apparatus 100 operates in the application execution mode, the controller 140 may not control an operation of the display apparatus 100 based on the first voice information determined as the execution command. Therefore, if the two domains do not correspond to each other, the execution command determiner 143 may determine the second voice information, which is not determined as the execution command, as a final execution command, and the controller 140 may transmit the second voice information determined as the final execution command to the interactive server 300 through the communicator 120 to receive response information related to the uttered voice of the user.

If reliability values of the first voice information and the second voice information are lower than a first threshold value, the controller 140 determines domains of the first voice information and the second voice information and applies a weight to a reliability value of the first or second voice information which has the determined domain corresponding to the current operation mode of the display apparatus 100. The controller 140 may determine the first or second voice information, to which the weight is applied, as an execution command according to whether the reliability value of the first or second voice information is greater than or equal to a first threshold value.

In detail, if the reliability values of the first voice information and the second voice information are lower than the first threshold value, the controller 140 may determine the first or second voice information as an execution command based on the apparatus status manager 141 and the execution command determiner 143 described above with reference to FIG. 4.

In more detail, if the reliability values of the first voice information and the second voice information are lower than the first threshold value, the execution command determiner 143 determines domains of the first voice information and the second voice information. For example, the current operation mode of the display apparatus 100 may be the application execution mode. In this case, the execution command determiner 143 may determine the domain of the current operation mode of the display apparatus 100 as a content recommendation-related domain. Also, the execution command determiner 143 may determine the domain of the first voice information as a control-related domain for controlling an apparatus operation and determine the domain of the second voice information as a content recommendation-related domain.

If the domains of the first voice information and the second voice information and the domain of the current operation mode of the display apparatus 100 are determined as described above, the execution command determiner 143 may acquire first or second voice information which have a domain corresponding to the domain determined in relation to the current operation mode of the display apparatus 100. As in the above-described example, the domain of the second voice information may correspond to the domain determined in relation to the current operation mode of the display apparatus 100. In this case, the execution command determiner 143 applies a weight to the reliability value of the second voice information. The execution command determiner 143 determines whether the reliability of the second voice information to which the weight is applied is greater than or equal to the first threshold value.

If it is determined that the reliability value of the second voice information to which the weight is applied is lower than the first threshold value, the execution command determiner 143 ends the determining of the execution command of the uttered voice of the user in relation to the first voice information and the second voice information. If the determining of the execution command is ended, the controller 140 generates a notification message for requesting re-uttering of the user's voice, and controls the display 160 to display the generated notification message on a screen.

If it is determined that the reliability value of the second voice information to which the weight is applied is greater than or equal to the first threshold value, the execution command determiner 143 determines the second voice information as an execution command of the uttered voice of the user. If an execution command of the first or second voice information is determined, the controller 140 may perform a control operation or transmit the corresponding first or second voice information to the interactive server 300 based on the first or second voice information determined as the execution information.

In detail, if the first voice information is determined as an execution command through the execution command determiner 143, the controller 140 performs the control operation according to a control command corresponding to the first voice information determined as the execution command among control commands corresponding to a plurality of pieces of voice information stored in the storage 150. If the second voice information is determined as an execution command through the execution command determiner 143, the controller 140 transmits the second voice information to the interactive server 300 through the communicator 120 to receive response information related to the second voice information from the interactive server 300. If the response information related to the second voice information is received, the display 160 may display a voice recognition result of the received response information on the screen according to the control command of the controller 140.

If an uttered voice of a user is input as described above, the display apparatus 100 according to the present exemplary embodiment performs a voice recognition process with respect to the inputted uttered voice and simultaneously receives a voice recognition result of the uttered voice from the voice recognition apparatus 200. After that, the display apparatus 100 performs an operation based on a voice recognition result appropriate for an intent of the user among a voice recognition result that is internally recognized and a voice recognition result that is received from the voice recognition apparatus 200 to actively cope with various types of utterances made by the user.

A structure of the interactive server 300 will now be described in detail.

Figure 7:
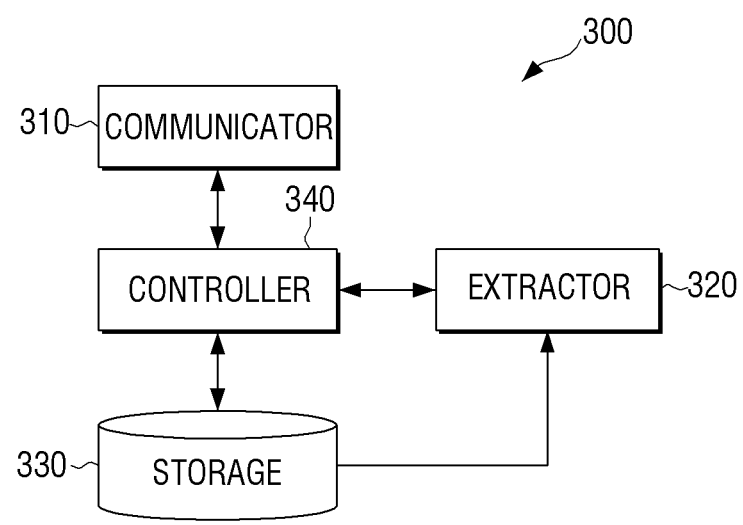
FIG. 7 is a block diagram of an interactive server according to an exemplary embodiment.

FIG. 7 is a block diagram of the interactive server 300, according to an exemplary embodiment.

Referring to FIG. 7, the interactive server 300 includes a communicator 310, an extractor 320, a storage 330, and a controller 340.

The communicator 310 may communicate with the display apparatus 100 to receive second voice information, which is converted into text information in relation to an uttered voice of a user, from the display apparatus 100. The extractor 320 extracts utterance factors from the second voice information received from the display apparatus 100 through the communicator 310. The second voice information may include a first utterance factor indicating an execution object and a second utterance factor indicating an execution command. In detail, the first utterance factor indicating the execution object is an utterance factor that is classified as a main feature in the uttered voice of the user, and the second utterance factor indicating the execution command is an utterance factor that is classified as a user action in the uttered voice of the user. For example, in an uttered voice "Search for action movie!", "action" may be a first utterance factor classified as a main feature, and "Search for" may be a second utterance factor classified as a user action.

If these utterance factors are extracted, the controller 340 generates response information related to the uttered voice of the user based on functions classified according to the extracted utterance factors and transmits the response information to the display apparatus 100. Here, the functions classified according to the utterance factors may include at least one of a content recommendation function, an electronic program guide (EPG)-related function, and an operation control function for controlling an operation of the display apparatus 100. Therefore, the controller 340 may generate response information corresponding to the uttered voice of the user based on the utterance factors extracted from the second voice information of the uttered voice of the user.

For example, if second voice information "Search for ∘∘∘ (content name)" of an uttered voice of the user is received, the extractor 320 may extract a first utterance factor "∘∘∘ (content name)" and a second utterance factor "Search for". If the first and second utterance factors are extracted from the uttered voice "Search for ∘∘∘ (content name)", the controller 340 determines that an execution area is a content based on the extracted first utterance factor. The controller 340 may also acquire an execution word "$∘∘∘ (content name)$" corresponding to the first utterance factor "∘∘∘

(content name)" with reference to execution words that are respectively defined according to first utterance factors stored in the storage 330. Also, the controller 340 determines that a type of the second utterance factor "Search for" is related to a content search, based on the execution area determined as the content. Therefore, the controller 340 may acquire a command "content_search" corresponding to the content search among commands that are respectively defined according to second utterance factors stored in the storage 330. The controller 340 may combine the execution word "$○○○ (content name)$" and the command "content_search" corresponding to the first and second utterance factors to generate an execution command script "content_search($○○○ (content name)$)". If such an execution command script is generated, the controller 340 transmits response information including the generated execution command script to the display apparatus 100. Therefore, the display apparatus 100 may receive content information of each episode of "○○○ (content name)" from a content providing server (not shown) based on the execution command script included in the response information received from the interactive server 300 and display a content list of the received content information of each episode on a screen.

As another example, the extractor 320 may extract a first utterance factor "bedtime reservation" and a second utterance factor "make" from second voice information of an uttered voice "Make bedtime reservation." If first and second utterance factors are extracted from the uttered voice "Make bedtime reservation.", the controller 340 determines that an execution area is an apparatus control, based on the extracted first utterance factor. The controller 340 may also acquire an execution word "$bedtime reservation$" corresponding to the first utterance factor "bedtime reservation" with reference to execution words that are respectively defined according to first utterance factors stored in the storage 330. Also, the controller 340 determines that a type of the second utterance factor "make" corresponds to an apparatus function execution, based on the execution area determined as the apparatus control. Therefore, the controller 340 may acquire a command "device_execute" corresponding to the apparatus function execution among commands that are respectively defined according to second utterance factors stored in the storage 330. The controller 340 may combine the execution word "$bedtime reservation$" and the command "device_execute" corresponding to the first and second utterance factors to generate an execution command script. If the execution command script is generated, the controller 340 transmits response information including the generated execution command script to the display apparatus 100. Therefore, the display apparatus 100 may set a bedtime reservation based on the execution command script included in the response information received from the interactive server 300 and output a notification message for notifying the interactive server 300 that the bedtime reservation is set, through at least one of a voice notification and a text notification.

The elements of the interactive server 300 according to the present exemplary embodiment have been described in detail. A method of controlling the display apparatus 100 according to an exemplary embodiment will now be described in detail.

Figure 8:
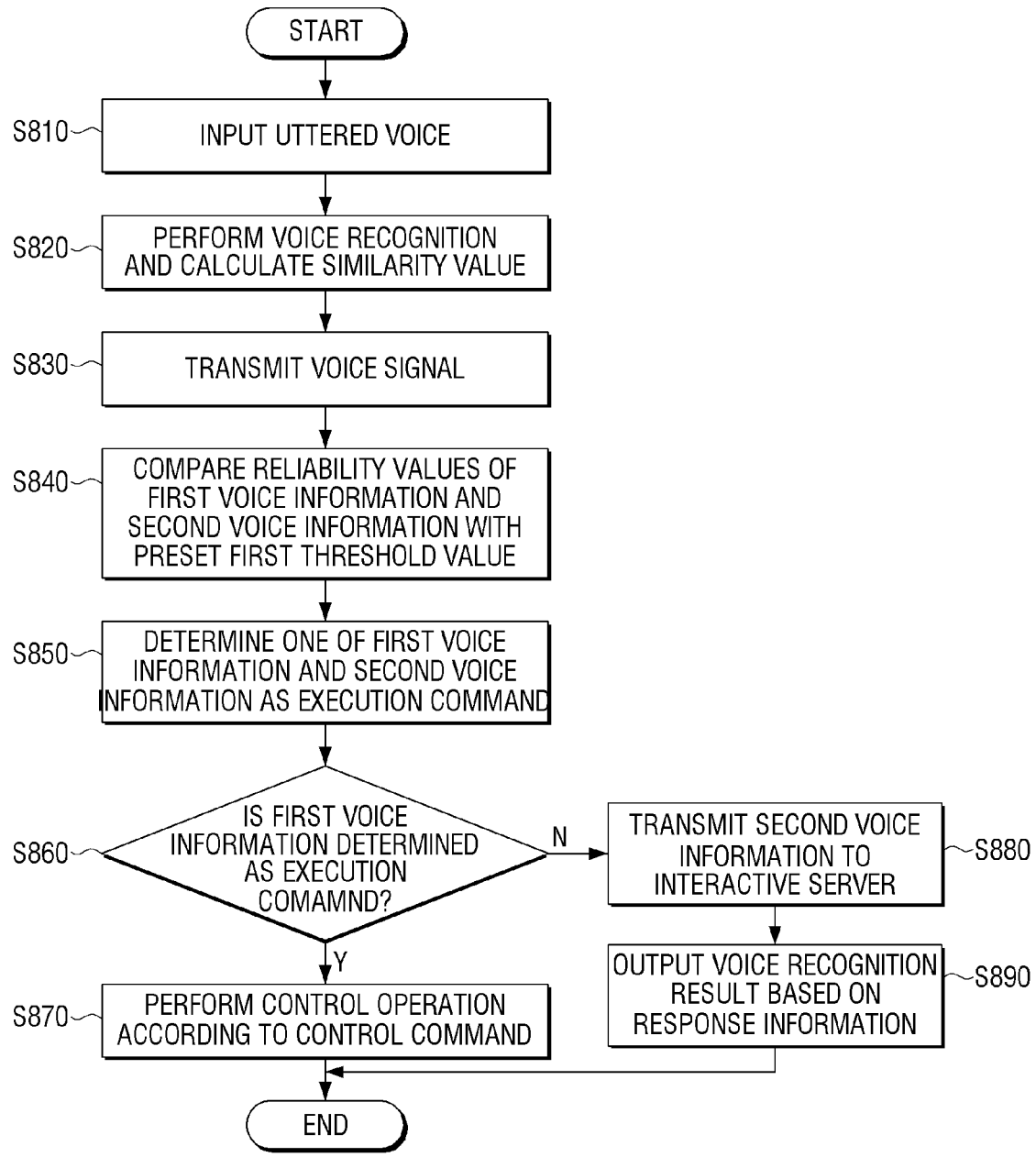
FIG. 8 is a flowchart of a method of controlling a display apparatus, according to an exemplary embodiment.

FIG. 8 is a flowchart of a method of controlling the display apparatus 100, according to an exemplary embodiment.

Referring to FIG. 8, if an uttered voice of a user is input, the display apparatus 100 samples the inputted uttered voice and converts the uttered voice into a digital voice signal in operation S810. In operation S820, the display apparatus 100 performs a voice recognition process with respect to the uttered voice converted into the voice signal to generate first voice information and calculates a reliability value of the first voice information. The first voice information may be text information into which the voice signal of the uttered voice of the user is converted. According to exemplary embodiments, the display apparatus 100 may convert the uttered voice of the user into a text by using an STT algorithm. In detail, the display apparatus 100 may generate the first voice information related to the uttered voice of the user based on a candidate group of a plurality of pieces of pre-stored voice information and calculate a reliability value of the first voice information.

In operation S830, the display apparatus 100 transmits the uttered voice of the user converted into the digital voice signal to the voice recognition apparatus 200. However, the exemplary embodiment is not limited thereto, and the display apparatus 100 may simultaneously perform operations S820 and 830.

If a voice recognition result of the uttered voice of the user is received from the voice recognition apparatus 200, the display apparatus 100 compares the reliability value of the first voice information calculated in operation S820 and a reliability value of second voice information included in the voice recognition result received from the voice recognition apparatus 200 with a preset first threshold value in operation S840. The second voice information may be text information into which the voice signal of the uttered voice of the user is converted.

If the reliability value of the first voice information or second voice information is greater than or equal to the first threshold value, the display apparatus 100 determines one of the first voice information or the second voice information which has a reliability value greater than or equal to the first threshold value as an execution command of the uttered voice of the user in operation S850. If it is determined in operation S860 that the first voice information among the first voice information and the second voice information is determined to be the execution command of the uttered voice of the user, the display apparatus 100 performs a control operation according to a control command corresponding to the first voice information among control commands corresponding to the plurality of pre-stored pieces of voice information, in operation S870.

If it is determined in operation S860 that the second voice information among the first voice information and the second voice information is determined to be the execution command of the uttered voice of the user, the display apparatus 100 transmits the second voice information determined to be the execution command to the interactive server 300 in operation S880. If response information related to the second voice information is received from the interactive server 300, the display apparatus 100 generates a voice recognition result related to the received response information and displays the voice recognition result on a screen in operation S890.

If the reliability values of the first voice information and the second voice information are greater than or equal to the first threshold value in operation S840, the display apparatus 100 may determine the first or second voice information to be an execution command of the uttered voice of the user according to the following method.

Figure 9:
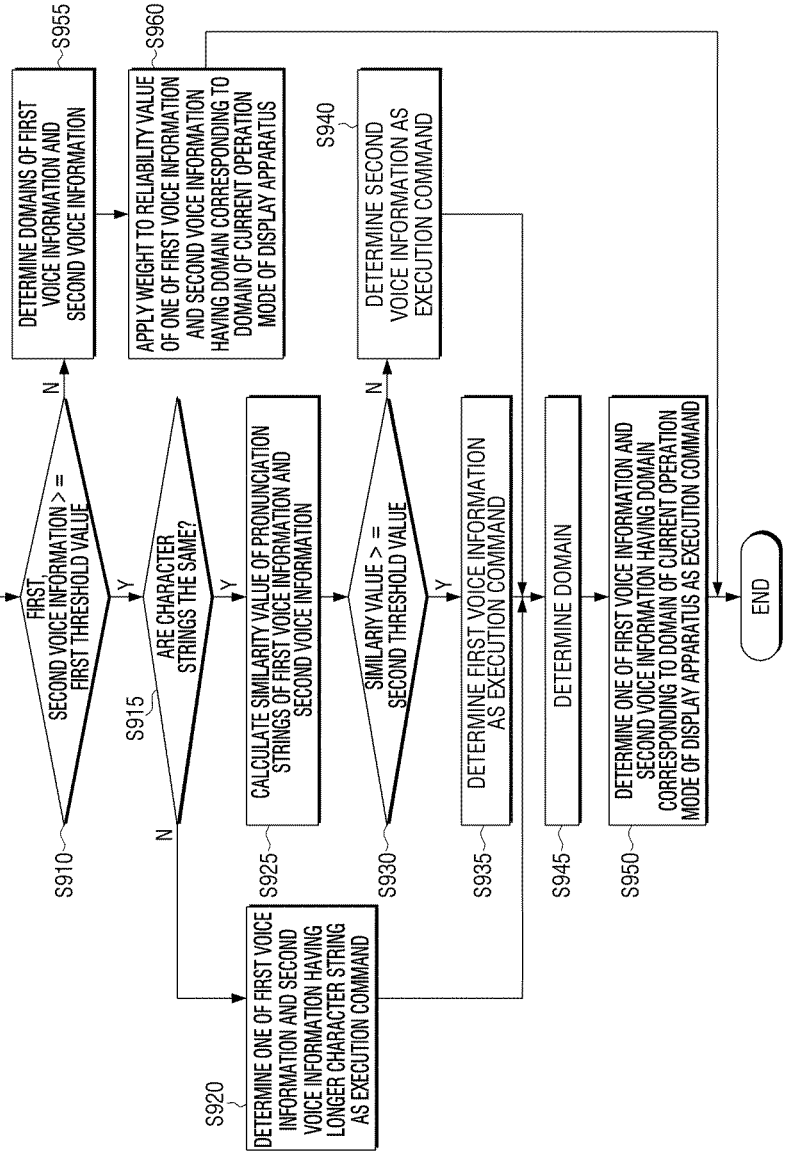
FIG. 9 is a flowchart of a method of determining first or second voice information as an execution command of an uttered voice of a user if reliability values of the first voice information and the second voice information are greater than or equal to or lower than a preset first threshold value in a display apparatus, according to an exemplary embodiment.

FIG. 9 is a flowchart of a method of determining first or second voice information as an execution command of an uttered voice of a user if reliability values of the first voice information and the second voice information are greater than or equal to or lower than a preset first threshold value in the display apparatus 100, according to an exemplary embodiment.

Referring to FIG. 9, in operation S910, the display apparatus 100 determines whether reliability values of first voice information and second voice information are greater than or equal to a preset first threshold value. If it is determined in operation S910 that the reliability values of the first voice information and the second voice information are greater than or equal to the preset first threshold value, the display apparatus 100 generates character strings from text information of the first voice information and the second voice information and compares lengths of the character strings to determine whether the lengths of the character strings are the same in operation S915. If it is determined in operation S915 that the lengths of the character strings generated from the text information of the first voice information and the second voice information are different from each other, the display apparatus 100 determines one of the first voice information or the second voice information which has the longer character string to be an execution command of an uttered voice of a user in operation S920.

If it is determined in operation S915 that the lengths of the character strings generated from the text information of the first voice information and the second voice information are the same, the display apparatus 100 calculates a similarity value of pronunciation strings generated from the text information of the first voice information and the second voice information by using a predefined similarity algorithm in operation S925. Here, the predefined similarity algorithm may be a confusion matrix. However, the present exemplary embodiment is not limited thereto, and the display apparatus 100 may compare the pronunciation strings generated from the text information of the first voice information and the second voice information to calculate the similarity value based on how many of the same pronunciation characters the pronunciation strings include.

If the similarity value of the pronunciation strings generated from the text information of the first voice information and the text information of the second voice information is calculated as described above, the display apparatus 100 compares the calculated similarity value with a preset second threshold value to determine whether the calculated similarity value is greater than or equal to the preset second threshold value in operation S930.

If it is determined in operation S930 that the similarity value is greater than or equal to the preset second threshold value, the display apparatus 100 determines the first voice information among the first voice information and the second voice information as a voice recognition result which is similar to the uttered voice of the user, and determines the first voice information to be an execution command of the uttered voice of the user in operation S935. If it is determined in operation S930 that the similarity value is lower than the preset second threshold value, the display apparatus 100 determines the second voice information among the first voice information and the second voice information to be a voice recognition result which is similar to the uttered voice of the user, and determines the second voice information to be an execution command of the uttered voice of the user in operation S940.

According to another exemplary embodiment, the display apparatus 100 may determine whether voice information determined as an execution command in the above-described operation is determined to be a final execution command.

For this, if the first or second voice information is determined to be the execution command of the uttered voice of the user, the display apparatus 100 determines a domain of the first or second voice information determined to be the execution command and a domain of a current operation mode of the display apparatus 100 in operation S945. In operation S950, the display apparatus 100 determines the first or second voice information which has a domain corresponding to the domain of the current operation mode of the display apparatus 100 to be a final execution command.

In detail, the display apparatus 100 determines whether the domain of the first voice information or the second voice information determined to be the execution command, and the domain of the current operation mode of the display apparatus 100 correspond to each other. If it is determined that the two domains correspond to each other, the display apparatus 100 may determine the first voice information or the second voice information determined to be the execution command as a final execution command. If it is determined that the two domains do not correspond to each other, the display apparatus 100 determines whether the domain of first voice information or the second voice information that is not determined as an execution command corresponds to the domain of the current operation mode of the display apparatus 100. If it is determined that the two domains correspond to each other, the display apparatus 100 may determine the first or second voice information that is not determined as the execution command, as a final execution command.

If it is determined in operation S910 that the reliability values of the first voice information and the second voice information are lower than the preset first threshold value, the display apparatus 100 determines domains of the first voice information and the second voice information in operation S955. If the domains of the first voice information and the second voice information are determined, the display apparatus 100 applies a weight to a reliability value of the first or second voice information which has a domain corresponding to the domain of the current operation mode of the display apparatus 100 in operation S960. Here, the weight may be a value enough to secure a reliability value greater than or equal to the first threshold value. If the weight is applied to the reliability value of the first or second voice information having the domain corresponding to the domain of the current operation mode of the display apparatus 100 as described above, the display apparatus 100 may determine the corresponding first or second voice information as an execution command of the uttered voice of the user.

However, the present exemplary embodiment is not limited thereto, and the weight that is applied to the reliability value of the first or second voice information having the domain corresponding to the domain of the current operation mode of the display apparatus 100 may be a preset fixed value. In this case, if a weight having a value of fixed size is applied to the reliability value of the first or second voice information having the domain corresponding to the domain of the current operation mode of the display apparatus 100, the display apparatus 100 re-determines whether the reliability value of the first or second voice information to which the weight is applied is greater than or equal to the preset first threshold value. If it is determined that the reliability value of the first or second voice information to which the weight is applied is greater than or equal to the first threshold value, the display apparatus 100 determines the corresponding first or second voice information as an execution command of the uttered voice of the user. If it is determined that the reliability value of the first voice information or the second voice information to which the weight is applied is lower than the first threshold value, the display apparatus 100 displays a notification message on the screen, requesting re-uttering of the voice input by the user. Therefore, the user may perform re-uttering of the voice input, and the display apparatus 100 may perform a voice recognition process with respect to a re-uttered voice of the user.

According to various exemplary embodiments as described above, if a display apparatus and an external apparatus simultaneously recognize an uttered voice of a user in an interactive system, the display apparatus may select a voice recognition result proximate to an intent of the user from two voice recognition results.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
an input configured to receive an uttered voice of a user;
a communicator configured to transmit a voice signal of the uttered voice to a voice recognition apparatus, which is external to the display apparatus, and receive a recognition result of the voice signal from the voice recognition apparatus;
a voice recognizer configured to perform a voice recognition process with respect to the uttered voice; and
a controller configured to:
compare a reliability of a first voice information recognized by the voice recognizer to a preset threshold value and compare a reliability value of a second voice information of the recognition result received from the voice recognition apparatus to the preset threshold value, wherein the first voice information and the second voice information are text information into which the voice signal of the uttered voice is converted; and
in response to the reliability value of the first voice information and the reliability value of the second voice information being greater than or equal to the preset threshold value, compare a length of a character string of the text information of the first voice information and a length of a character string of the text information of the second voice information and determine one from among the first voice information and the second voice information, which has a longer character string, to be an execution command.

2. The display apparatus of claim 1, wherein the controller is configured to calculate a similarity value of pronunciation strings from the text information of the first voice information and the text information of the second voice information based on a predefined similarity algorithm when the length of the character string of the text information of the first voice information and the length of the character string of the text information of the second voice information are equal, determine the first voice information as an execution command when the calculated similarity value is greater than or equal to a preset threshold value, and determine the second voice information to be an execution command when the calculated similarity value is lower than the preset threshold value.

3. The display apparatus of claim 2, wherein the controller is further configured to, when the execution command of the uttered voice is determined, determine a domain based on one from among the first voice information and the second voice information determined to be the execution command and is configured to determine the one from among the first voice information and the second voice information determined to be the execution command to be a final execution command based on a condition that the determined domain and a domain of a current operation mode of the display apparatus correspond to each other.

4. The display apparatus of claim 1, wherein the controller is further configured to, when the reliability values of the first voice information and the reliability values of the second voice information are lower than the preset threshold value, determine a domain of the first voice information and a domain of the second voice information, apply a weight to one from among the reliability value of the first voice information and the reliability value of the second voice information, which has a domain corresponding to the domain of a current operation mode of the display apparatus, and determine the one from among the first voice information and the second voice information to which the weight is applied to be an execution command based on a condition that the reliability value of the one from among the first voice information and the second voice information to which the weight is applied is greater than or equal to the preset threshold value.

5. The display apparatus of claim 1, further comprising:
a storage configured to store control commands corresponding to a plurality of pieces of voice information; and
a display configured to display a voice recognition result of response information received from an interactive server,
wherein the controller is further configured to, when the first voice information is recognized by the voice recognizer and is determined to be the execution command, perform a control operation according to a control command corresponding to the first voice information among the control commands stored in the storage and, in response to the second voice information being received from the voice recognition apparatus and being determined to be the execution command, transmit the second voice information to the interactive server through the communicator to receive response information related to the second voice information from the interactive server.

6. A method of controlling a display apparatus, the method comprising:
receiving an uttered voice of a user;
performing a voice recognition process with respect to the uttered voice to calculate a reliability value of first voice information;
transmitting a voice signal of the uttered voice of the user to a voice recognition apparatus, which is external to the display apparatus, and receiving a voice recognition result of the voice signal from the voice recognition apparatus;
in response to the voice recognition result of the uttered voice being received from the voice recognition apparatus, comparing the reliability value of the first voice information to a preset threshold value and comparing a reliability value of second voice information received in the voice recognition result to the preset threshold value, wherein the first voice information and the second voice information are text information into which a voice signal of the uttered voice is converted; and in response to the reliability value of the first voice information and the reliability value of the second voice information being greater than or equal to the preset threshold value, comparing a length of a character string of the text information of the first voice information and a length of a character string of the second voice information and determining one from among the first voice information and the second voice information, which has a longer character string, to be an execution command.

7. The method of claim 6, wherein when the length of the character string of the first voice information and the length of the character string of the second voice information are the same, a similarity value of pronunciation strings of the text information of the first voice information and the text information of the second voice information is calculated based on a pre-stored similarity algorithm, when the calculated reliability value is greater than or equal to a preset threshold value, the first voice information is determined to be an execution command, and when the calculated similarity value is lower than the preset threshold value, the second voice information is determined to be an execution command.

8. The method of claim 7, further comprising:
when the execution command of the uttered voice is determined, determining a domain based on the first voice information or the second voice information determined as the execution command; and
determining the first or second voice information determined to be the execution command as a final execution command according to a condition that the determined domain corresponds to a domain of a current operation mode of the display apparatus.

9. The method of claim 6, further comprising:
when the reliability value of the first voice information and the reliability value of the second voice information are lower than the preset threshold value, determining domains of the first voice information and the second voice information; and
applying a weight to the reliability value of the first voice information or the second voice information which has a domain corresponding to a domain of a current operation mode of the display apparatus,
wherein the first voice information or second voice information to which the weight is applied is determined to be an execution command according to a condition that the reliability value of the first voice information or the second voice information to which the weight is applied is greater than or equal to the preset threshold value.

10. The method of claim 6, further comprising:
when the first voice information is determined to be the execution command, performing a control operation according to a control command related to the first voice information among a plurality of pre-stored control commands, and when the second voice information is determined to be the execution command, receiving response information related to the second voice information from an interactive server and displaying a voice recognition result related to the received response information.

11. An interactive system comprising:
a display apparatus configured to, when an uttered voice of a user is input, perform a voice recognition process based on a voice signal of the uttered voice and transmit the voice signal to a voice recognition apparatus, which is external to the display apparatus; and
the voice recognition apparatus configured to perform a voice recognition process based on the voice signal received from the display apparatus and transmit a voice recognition result of the voice recognition to the display apparatus,
wherein when the voice recognition result is received from the voice recognition apparatus, the display apparatus compares a reliability value of a first voice information to a preset threshold value and a reliability value of a second voice information to the preset threshold value, wherein the first voice information and the second voice information are text information into which a voice signal of the uttered voice is converted, and in response to the reliability value of the first voice information and the reliability value of the second voice information is greater than or equal to the threshold value, the display apparatus compares a length of a character string of the text information of the first voice information and a length of a character string of the text information of the second voice information and determines the first voice information or the second voice information which has a longer character string to be an execution command.

12. The interactive system of claim 11, wherein the display apparatus calculates a similarity value of pronunciation strings of the text information of the first voice information and the text information of the second voice information based on a predefined similarity algorithm when the lengths of the character strings are the same, determines the first voice information to be an execution command when the calculated similarity value is greater than or equal to a preset threshold value, and determines the second voice information to be an execution command in response to the calculated similarity value being lower than the threshold value.

13. The interactive system of claim 12, wherein the display apparatus determines a domain based on the first voice information or the second voice information determined to be the execution command when the execution command of the uttered voice is determined and determines the first voice information or the second voice information determined to be the execution command as a final execution command according to whether the determined domain corresponds to a domain of a current operation mode of the display apparatus.

14. The interactive system of claim 11, wherein when the reliability value of the first voice information and the reliability value of the second voice information is lower than the threshold value, the display apparatus determines a domain of the first voice information and a domain of the second voice information, apply a weight to the reliability value of the first voice information or the second voice information which has a domain corresponding to a domain of a current operation mode of the display apparatus, and determines the first voice information or the second voice information to which the weight is applied to be an execution command upon a condition that the reliability value of the first voice information or the second voice information to which the weight is applied is greater than or equal to the threshold value.

15. The interactive system of claim 11, wherein the display apparatus performs a control operation according to a control command related to the first voice information when the first voice information is determined to be the execution command, and transmits the second voice information to an interactive server to receive response information related to the second voice information and displays a voice recognition result related to the received response information when the second voice information is determined to be the execution command.

16. A method of controlling a display apparatus, the method comprising:
   receiving an uttered voice of a user at the display apparatus;
   converting the uttered voice to a voice signal, and generating first voice information;
   calculating a reliability value of the first voice information;
   transmitting the voice signal to a voice recognition apparatus, which is external to the display apparatus;
   generating, by the voice recognition apparatus, second voice information;
   receiving the second voice information from the voice recognition apparatus;
   calculating a reliability value of the second voice information;
   comparing the reliability value of the first voice information and the reliability value of the second voice information with a threshold value, wherein the first voice information and the second voice information are text information into which the voice signal of the uttered voice are converted;
   in response to the reliability value of the first voice information and the reliability value of the second voice information being equal to or greater than the threshold value, comparing a length of a character string of the text information of the first voice information and a length of a character string of the text information of the second voice information; and
   determining voice information having a character string of a longer length from among the length of the character string of the text information of the first voice information and the length of the character string of the text information of the second voice information to be an execution command.

* * * * *